United States Patent [19]

Suzuki et al.

[11] 3,873,720

[45] Mar. 25, 1975

[54] NUTRIENT FAT EMULSION

[75] Inventors: Akira Suzuki; Hiroshi Miura, both of Osaka; Katsuya Sawada, Inuyama; Yoshiyuki Koida, Kawanishi, all of Japan

[73] Assignee: Tanabe Seiyaku Co., Ltd., Osaka, Japan

[22] Filed: Jan. 30, 1974

[21] Appl. No.: 437,921

[30] Foreign Application Priority Data

Feb. 12, 1973 Japan................................ 48-17331

[52] U.S. Cl................. 424/312, 424/318, 424/343
[51] Int. Cl.$^2$......................................... A61K 27/00
[58] Field of Search................... 424/312, 318, 343

[56] References Cited
UNITED STATES PATENTS
2,853,419  9/1958  Degkwitz............................ 424/312
3,169,094  2/1965  Wretlind............................. 424/312

Primary Examiner—Sam Rosen
Attorney, Agent, or Firm—Bierman & Bierman

[57] ABSTRACT

An aqueous mixture of fat, carbohydrate and amino acids is emulsified with the aid of long-chain fatty acid or its basic amino acid salt and egg-yolk phospholipids. Egg-yolk phospholipids is employed in an amount of 0.05 to 0.3 g per g of fat. Moreover, long-chain fatty acid or its basic amino acid salt is employed in an amount of 0.02 to 3.0 g per g of phospholipids. The emulsification is carried out under a pressure of more than 300 kg/cm$^2$. A stable nutrient fat emulsion in which fat particles have the average diameter of less than 0.5 $\mu$ is obtained.

11 Claims, No Drawings

NUTRIENT FAT EMULSION

This invention relates to a nutrient fat emulsion and a method of preparing same. More particularly, it relates to a stable, substantially non-toxic, oil-in-water emulsion which contains at least three major nutrients, i.e., fat, carbohydrate and amino acids.

A daily intake of foods or nutrients to patients is of great importance to maintain their good health condition. When oral feeding is impossible as in the case of geriatric patients or patients who are in pre- or post-operation, necessitated nutrients and calorie sources must be given parenterally to them.

Several fat emulsions, aqueous carbohydrates infusion solutions and aqueous amino acid infusion solutions have been so far available for the purpose of intravenous administration of nutrients or calorie sources, and a mixture of these pharmaceutical preparations have been employed in clinical use. However, the clinical use of the mixture of these preparations are disadvantageous because a large amount of the mixture must be administered to patients in order to keep their necessitated nutrients and calorie sources. Moreover, the intravenous administration of a large amount of said mixture causes various side effects such as chill, vomit and pain in the chest and back. Further, almost all of known fat emulsions have been prepared by using a nonionic surfactant (e.g., polyoxyethylenesorbitan oleate, sorbitan monooleate) or soybean phospholipids as an emulsifying agent. These known emulsions are not stable because fat particles thereof bring about coalescence or partial destruction in the presence of electrolyte such as L-arginine, L-lysine, L-aspartic acid or L-glutamic acid. Accordingly, these fat emulsions can not be mixed with an aqeuous amino acid infusion solution without remarkable deterioration of the emulsion or increase in the diameter of fat particles. Egg-yolk phospholipids per se is known to be inferior in its ability of emulsification, although side effects thereof such as hypotensive activity are less than those of soybean phospholipids.

Recently, German Patent No. 1,792,294 has succeeded in preparing a nutrient, pyrogen-free, fat emulsion by emulsifying an aqueous mixture of fat, carbohydrate and amino acids with the aid of soybean phospholipids under high pressure. However, said emulsion is not available as a better fat emulsion for complete intravenous nutrition. For example, although L-arginine is known to exert the most potent effect of detoxication against blood ammonia in living bodies, it can not be added to the emulsion of said German Patent because of its deteriorating effect upon the fat particles of the emulsion. According to the method of said German Patent, therefore, L-ornithine which is inferior to L-arginine in the detoxication against blood ammonia must be employed instead of L-arginine as one of active ingredients. Moreover, L-glutamic acid and L-aspartic acid are not added to the emulsion of said German Patent.

We have now found that long-chain fatty acid or its basic amino acid salt is useful to improve and enhance the emulsifying ability of egg-yolk phospholipids. We have also found that a stable oil-in-water emulsion in which fat particles have the average diameter of less than 0.5 μ can be prepared by emulsifying a mixture of water and fat with the aid of long-chain fatty acid or its basic amino acid salt and egg-yolk phospholipids. We have further found that the oil-in-water emulsion thus obtained is excellently stable to the extent that it is not destroyed in the presence of electrolyte such as L-arginine, L-lysine, L-aspartic acid or L-glutamic acid.

One object of the present invention is to provide a method of using a mixture of long-chain fatty acid or its basic amino acid salt and egg-yolk phospholipids as an emulsifying agent. Another object of the invention is to provide a method of preparing an oil-in-water emulsion which contains at least three major nutrients, i.e., fat, carbohydrate and amino acids, in a pertinent nutritional proportion. Other object is to provide a stable fat emulsion in which fat particles have the average diameter of less than 0.5 μ, especially less than 0.3 μ. Further object is to provide a substantially non-toxic fat emulsion which is suitable for use as nutrient and calorie sources for those patients who require intravenous alimentation. Still further objects of the present invention will be apparent from the descriptions which follow.

According to the present invention, a stable nutrient fat emulsion can be prepared by emulsifying an aqueous mixture of fat, carbohydrate and amino acids under high pressure with the aid of long-chain fatty acid or its basic amino acid salt and egg-yolk phospholipids.

Fatty acids having 12 to 20 carbon atoms are preferably used in the present invention. Suitable long-chain fatty acids include, for example, saturated fatty acids such as palmitic acid, stearic acid, lauric acid and myristic acid, and unsaturated fatty acids such as oleic acid, linoleic acid, linolenic acid and arachidonic acid. The unsaturated fatty acids as mentioned above is especially suitable for the purpose of the present invention. Preferred examples of the basic amino acid salts of these fatty acids include arginine, lysine and ornithine salts thereof.

The nutrient fat emulsion of the present invention can be prepared in conventional manners. For example, fat, egg-yolk phospholipids and long-chain fatty acid or its basic amino acid salt are dispersed into water. The aqueous dispersed solution is emulsified. carbohydrate and amino acids are added to the emulsion, and the aqueous mixture thus obtained is again emulsified. The nutrient fat emulsion of the present invention is thereby obtained. Alternatively, the nutrient fat emulsion of the present invention may be prepared by dispersing fat, carbohydrate, long-chain fatty acid or its salt and egg-yolk phospholipids into water, emulsifying the aqueous mixture, adding amino acids thereto, and again emulsifying the aqueous mixture thus obtained. Suitable amount of egg-yolk phospholipids which is used in the present invention is 0.05 to 0.30 g, especially 0.1 to 0.25 g, per g of fat. From a practical point of view it is preferred to use a well-purified, pyrogen-free, egg-yolk phospholipids for the present invention. Preferred amount of long-chain fatty acid or its basic amino acid salt to be used is 0.02 to 3.0 g, especially 0.05 to 2.5 g, per g of phospholipids. The emulsification of the present invention is carried out by a conventional homogenizer. For example, devices in which dispersion is effected by forcing the mixture to be emulsified through a small orifice under high pressure can be employed for the purpose of the present invention. Suitable examples of said devices are disclosed in "EMULSION: THEORY and PRACTICE", pages 227-230 (1957) (published by Reinhold Publishing Corp., New York, U.S.A.) hereby incorporated by reference.

Fat particles in an oil-in-water emulsion for intravenous use should have the average diameter of less than 0.5 $\mu$, especially less than 0.3 $\mu$, because otherwise the emulsion may cause unfavorable effects upon the microcirculation in blood capillaries. In order to produce fat particles having the average diameter of less than 0.5 $\mu$, it is suitable to carry out the emulsification of the present invention under a pressure of more than 300 kg/cm$^2$, especially 350 to 550 kg/cm$^2$. This pressure may be applied at one time to an aqueous dispersed solution of fat, carbohydrate and/or amino acids. Alternatively, it may be applied to said dispersed solution through two or more stages, for example, by passing said dispersed solution through the first stage at a high pressure of 250 to 400 kg/cm$^2$ and then through the second stage at a reduced pressure of 80 to 150 kg/cm$^2$. When applied through the multiple stages as mentioned above, the total pressure applied should be more than 300 kg/cm$^2$, especially 350 to 550 kg/cm$^2$.

All of amino acids which will become necessary to patients from a nutritional view-point can be added to the nutrient fat emulsion of the present invention in any proportions. For example, two or more amino acids selected from the group consisting of L-isoleucine, L-leucine, L-lysine, L-valine, L-methionine, L-threonine, L-tryptophan, L-phenylalanine, L-alanine, L-proline, L-glutamic acid, L-aspartic acid, L-serine, L-arginine, L-histidine, L-tyrosine, L-cystein, L-cystine and glycine can be preferably added thereto. Moreover, in preparing the nutrient fat emulsion of the present invention, various fats such as sesame seed oil, peanut oil, olive oil, safflower oil and soybean oil can be employed as one of the three major nutrients. Among these oils, soybean oil is the most suitable because of its less toxicity as compared with others. Carbohydrate employed in the present invention should be the one which does not react with amino acids. For this purpose, it is preferred to use sugar alcohol such as xylitol or sorbitol. Suitable concentrations of amino acids, fat and carbohydrate in the nutrient fat emulsion of the present invention are 1 to 15 w/v %, 1 to 15 w/v % and 1 to 30 w/v %, respectively, based on the total volume of the emulsion. The optimum weight proportions between these three major nutrients as well as between the above-mentioned amino acids to be present in the emulsion may be readily determined in accordance with various investigations as to nutritional and caloric balances in mammals, such as those disclosed in Nutr. Metabol., 14; 1–170 (1972) (A. Wretlind). If necessary, vitamines, minerals, stabilizers and other therapeutically valuable substances may be added to the emulsion. In any cases, the nutrient fat emulsion of the present invention shows sufficient stability for a long period of time.

Practical and presently-preferred embodiments of the present invention are illustratively shown in the following Examples. In this specification, the terminology "nutrient fat emulsion" refers to an oil-in-water emulsion which contains at least three major nutrients, i.e., fat, carbohydrate and amino acids. Additionally, "water" employed in the following Experiments and Examples is "distilled water for injection" which meets with the standard of U.S. Pharmacopoeia 18th Edition.

Experiment I 120 g of egg-yolk phospholipids and 1000 g of xylitol are dispersed into 3 liters of water under vigorous agitation. 1000 g of soybean oil are added to the dispersed solution. The dispersed solution is agitated vigorously, and water is added thereto to bring its total volume to 10 liters. Then, the dispersed solution is emulsified by the homogenizer (Manton-Gaulin Manufacturing Co. Inc., Model M3). The pressure is adjusted to 350 kg/cm$^2$ at the first stage of emulsification and 100 kg/cm$^2$ at the second stage thereof. 10 liters of a fat emulsion are obtained.

Aqueous amino acid solutions are prepared according to the following formulas A, B, C, D and E, respectively. 10 liters of each one of the aqueous solutions are mixed with 10 liters of the fat emulsion obtained above. The mixture is emulsified in the same manner as described above, charged into vials and then sterilized at 120°C for 30 minutes. Samples A, B, C, D and E of nutrient fat emulsions are thereby obtained. Immediately after Samples A through E are obtained, the size of fat particles therein are observed microscopically. The results of said observation are shown in Table 1.

Formula A

| | |
|---|---|
| L-Methionine | 0.2 w/v % |
| L-Isoleucine | do. |
| L-Leucine | do. |
| L-Threonine | do. |
| L-Valine | do. |
| L-Alanine | do. |
| L-Proline | do. |
| L-Serine | do. |
| L-Histidine | do. |
| Glycine | do. |
| L-Cystine | 0.04 w/v % |
| L-Tryptophan | 0.2 w/v % |
| L-Phenylalanine | do. |
| L-Tyrosine | 0.02 w/v % |

Formula B 0.2 w/v % of L-glutamic acid is added to Formula A.

Formula C 0.2 w/v % of L-aspartic acid is added to Formula A.

Formula D 0.2 w/v % of L-arginine is added to Formula A.

Formula E 0.2 w/v % of L-lysine acetate is added to Formula A.

Table 1

| Samples | Observation of fat particles |
|---|---|
| A | Particles having the diameter of more than 0.5 $\mu$ are not observed (average diameter: 0.3 $\mu$) |
| B | Many large particles having the diameter of up to 12 $\mu$ are observed (average diameter: 1 $\mu$) |
| C | Many large particles having the diameter of up to 12 $\mu$ are observed (average diameter: 1 $\mu$) |
| D | Many large particles having the diameter of up to 7 to 8 $\mu$ are observed (average diameter: 1 $\mu$) |
| E | Many particles having the diameter of up to 6 $\mu$ are observed (average diameter: 1 $\mu$) |

As can be seen in the aforementioned, many large fat particles having the diameter of up to 12 μ are observed in Samples B through E, although the diameter of fat particles of Sample A is less than 0.5 μ. This is due to a fact that the nutrient fat emulsions obtained above are not stable enough to keep fat particles thereof from coalescing or being partially destroyed in the presence of L-glutamic acid, L-aspartic acid, L-arginine or L-lysine acetate.

Experiment II 2000 g of sorbitol and 240 g of egg-yolk phospholipids are dispersed into 3 liters of water under vigorous agitation. A certain amount of fatty acid or its amino acid salt described in Table 2 and 1000 g of soybean oil are added to the dispersed solution. The dispersed solution is agitated vigorously, and water is added thereto to bring its total volume to 10 liters. Then, the dispersed solution is emulsified by the homogenizer (Manton-Gaulin Manufacturing Co. Inc., Model M3). The pressure is adjusted to 350 kg/cm² at the first stage of emulsification and 100 kg/cm² at the second stage thereof. 10 liters of a fat emulsion are obtained.

An aqueous amino acid solution is prepared according to the following formula:

Formula

| | |
|---|---|
| L-Isoleucine | 0.598 w/v % |
| L-Leucine | 1.138 |
| L-Lysine hydrochloride | 0.980 |
| L-Phenylalanine | 0.974 |
| L-Tyrosine | 0.058 |
| L-Methionine | 0.434 |
| L-Cystine | 0.024 |
| L-Threonine | 0.504 |
| L-Tryptophan | 0.188 |
| L-Valine | 0.690 |
| L-Arginine | 1.230 |
| L-Histidine | 0.523 |
| L-Alanine | 0.822 |
| L-Glutamic acid | 0.102 |
| L-Aspartic acid | 0.202 |
| L-Proline | 1.064 |
| Glycine | 1.568 |
| L-Serine | 0.468 |

10 liters of the aqueous amino acid solution are mixed with 10 liters of the fat emulsion obtained above. The mixture is emulsified in the same manner as described above, charged into vials and then sterilized at 120°C for 20 minutes. When a nutrient fat emulsion is prepared as above, the size of fat particles thereof are observed microscopically. The results of said observation are shown in Table 2.

Table 2

| Fatty acids or amino acid salts thereof used | Amount of addition (w/v %) | Observation of fat particles |
|---|---|---|
| Linoleic acid | 0.300 | Particles having the diameter of more than 0.5 μ are not observed (average diameter: 0.3 μ) |
| Linolenic acid | 0.300 | (average diameter: 0.3 μ) " |
| Oleic acid | 0.300 | (average diameter: 0.3 μ) " |
| Stearic acid | 0.100 | (average diameter: 0.3 μ) " |
| Palmitic acid | 0.200 | (average diameter: 0.3 μ) " |
| L-Lysine linolenate | 0.458 | (average diameter: 0.3 μ) " |
| L-Lysine linoleate | 0.456 | (average diameter: 0.3 μ) " |
| L-Lysine oleate | 0.455 | (average diameter: 0.3 μ) " |
| L-Lysine stearate | 0.454 | (average diameter: 0.3 μ) " |
| L-Lysine parmitate | 0.471 | (average diameter: 0.3 μ) " |
| L-Arginine oleate | 0.485 | (average diameter: 0.3 μ) " |
| L-Ornithine oleate | 0.440 | (average diameter: 0.3 μ) " |
| Linolenic acid | 0.150 | |
| Linoleic acid | 0.150 | (average diameter: 0.3 μ) " |
| Linoleic acid | 0.15 | |
| L-Lysine oleate | 0.258 | (average diameter: 0.3 μ) |
| L-Lysine oleate | 0.304 | Particles having the diameter of more than 0.5 μ are not observed (average diameter: 0.3 μ) |
| L-Arginine linoleate | 0.304 | |
| Control | 0.0 | Many large particles having the diameter of up to 15 μ are observed (average diameter: 1 μ) |

It is clear from the above-mentioned data that when an aqueous dispersed solution of soybean oil and sorbitol is emulsified with the aid of fatty acid or its salt and egg-yolk phospholipids, the nutrient fat emulsion thus obtained is stable enough to keep fat particles thereof from coalescing or being destroyed in the presence of L-arginine, L-lysine, L-aspartic acid or L-glutamic acid.

Example 1

40 g of egg-yolk phospholipids and 1000 g of xylitol are dispersed into 3 liters of water under vigorous agitation. 50 g of linoleic acid and 400 g of soybean oil are added to the dispersed solution. The dispersed solution is agitated vigorously, and water is added thereto to bring its total volume to 5 liters. Then, the dispersed solution is emulsified by the homogenizer (Marton-Gaulin Manufacturing Co. Inc., Model M3). The pressure is adjusted to 350 kg/cm² at the first stage of emulsification and 100 kg/cm² at the second stage thereof. 5 liters of a fat emulsion are obtained.

5 liters of an aqueous amino acid solution are prepared according to the following formula:

Formula

| | |
|---|---|
| L-Methionine | 11.4 g |
| L-Isoleucine | 15.8 |
| L-Leucine | 30.1 |
| L-Lysine hydrochloride | 25.9 |
| L-Threonine | 13.3 |
| L-Valine | 18.2 |
| L-Alanine | 21.7 |
| L-Proline | 28.1 |
| L-Glutamic acid | 2.7 |
| L-Aspartic acid | 5.3 |
| L-Serine | 12.3 |
| L-Arginine | 32.5 |
| L-Histidine | 13.8 |
| L-Tryptophane | 4.9 |
| L-Phenylalanine | 25.7 g |
| L-Tyrosine | 1.5 |
| L-Cystine | 0.6 |
| Glycine | 41.4 |

5 liters of the aqueous amino acid solution are mixed with 5 liters of the fat emulsion obtained above. The mixture is emulsified in the same manner as described above, charged into vials and then sterilized at 120°C for 20 minutes. A nutrient fat emulsion is thereby obtained. Fat particles of the nutrient fat emulsion show the average diameter of 0.3 μ.

Example 2

A nutrient fat emulsion is obtained in the same manner as described in Example 1 except that 75 g of L-lysine oleate are employed instead of 50 g of linoleic acid. Fat particles of the nutrient fat emulsion show the average diameter of 0.3 μ.

Example 3

50 g of egg-yolk phospholipids are dispersed into 3 liters of water under vigorous agitation. 61.5 g of L-arginine are dissolved in the dispersed solution. 20 g of linoleic acid, 20 g of linolenic acid and 500 g of soybean oil are dispersed into the dispersed solution under vigorous agitation, and water is added thereto to bring its total volume to 5 liters. Then, the dispersed solution is emulsified by the homogenizer (Manton Gaulin Manufacturing Co. Inc., Model M3). The pressure is adjusted to 400 kg/cm$^2$ at the first stage of emulsification and 100 kg/cm$^2$ at the second stage thereof. 5 liters of a fat emulsion are obtained.

5 liters of an aqueous carbohydrate and amino acid solution are prepared according to the following formula:

Formula

| | | |
|---|---|---|
| Sorbitol | 1000 | g |
| L-Methionine | 21.7 | |
| L-Isoleucine | 29.9 | |
| L-Leucine | 56.9 | |
| L-Threonine | 25.2 | |
| L-Valine | 34.5 | |
| L-Alanine | 41.1 | |
| L-Proline | 53.2 | |
| L-Glutamic acid | 5.1 | |
| L-Aspartic acid | 10.1 | |
| L-Serine | 23.4 | |
| L-Lysine hydrochloride | 49.0 | |
| L-Histidine | 26.1 | g |
| L-Tryptophan | 9.4 | |
| L-Phenylalanine | 48.7 | |
| L-Tyrosine | 2.9 | |
| L-Cystine | 1.2 | |
| Glycine | 78.4 | |

5 liters of the aqueous carbohydrate and amino acid solution are mixed with 5 liters of the fat emulsion obtained above. The mixture is emulsified in the same manner as described above, charged into vials and then sterilized at 120°C for 20 minutes. A nutrient fat emulsion is thereby obtained. Fat particles of the nutrient fat emulsion show the average diameter of 0.3 μ.

What we claim is:

1. An oil-in-water emulsion comprising 1–15 w/v% based on the emulsion of a fat selected from the group consisting of sesame seed oil, peanut oil, olive oil, safflower oil and soybean oil, 1–30 w/v% based on the emulsion of a carbohydrate selected from the group consisting of xylitol and sorbitol, 1–15 w/v% based on the emulsion of at least 2 amino acids selected from the group consisting of L-isoleucine, L-leucine, L-lysine, L-valine, L-methionine, L-threonine, L-tryptophan, L-phenylalanine, L-alanine, L-proline, L-glutamic acid, L-aspartic acid, L-serine, L-arginine, L-histidine, L-tyrosine, L-cystein, L-cystine and glycine, 0.05 to 0.30 g per g of fat of egg-yolk phospholipids, 0.02 to 3.0 per g of phospholipids of fatty acid having 12 to 20 carbon atoms or a salt thereof with arginine, lysine or ornithine and a sufficient amount of water to bring the emulsion up to 100 w/v%, said fat constituting the dispersed phase of said emulsion, particles of dispersed fat having an average diameter of less than 0.5 μ.

2. The emulsion of claim 1 in which said egg-yolk phospholipids are present in an amount of 0.1 to 0.25 g per g of fat, and said fatty acid or its salt is present in an amount of 0.05 to 2.5 per g of phospholipids.

3. The oil-in-water emulsion claimed in claim 1, wherein said fat is soybean oil.

4. The oil-in-water emulsion claimed in claim 2, wherein said fat is soybean oil.

5. A method of preparing an oil-in-water emulsion which comprises dispersing an aqeuous mixture, said aqueous mixture containing at least 1 to 15 w/v% based on the emulsion of a fat selected from the group of sesame seed oil, peanut oil, olive oil, safflower oil or soybean oil, 1 to 30 w/v% based on the emulsion of a carbohydrate selected from the group of xylitol and sorbitol and 1 to 15 w/v% based on the emulsion of at least two amino acids selected from the group of L-isoleucine, L-leucine, L-lysine, L-valine, L-methionine, L-threonine, L-tryptophan, L-phenylalanine, L-alanine, L-proline, L-glutamic acid, L-aspartic acid, L-serine, L-arginine, L-histidine, L-tyrosine, L-cystein, L-cystine, and glycine, with an homogenizer under a pressure of more than 300 kg/cm$^2$ with the aid of a mixture of 0.05 to 0.30 g per g of fat of egg-yolk phospholipids and 0.02 to 3.0 g per g of phospholipids of fatty acid having 12 to 20 carbon atoms or a salt thereof with arginine, lysine or ornithine, to give the oil-in-water emulsion in which fat particles have an average diameter of less than 0.5 μ.

6. The method according to claim 5, wherein the egg-yolk phospholipids and fatty acid or its salt are employed in an amount of 0.1 to 0.25 g per g of fat and 0.05 to 2.5 g per g of phospholipids, respectively.

7. The method according to claim 5, wherein the pressure is adjusted to 350 to 550 kg/cm$^2$.

8. The method according to claim 5, wherein egg-yolk phospholipids and fatty acid or its salt are employed in an amount of 0.05 to 0.30 g per g of fat and 0.02 to 3.0 g per g of phospholipids, respectively, and the pressure is adjusted to 350 to 550 kg/cm$^2$.

9. The method according to claim 5, wherein said fat is soybean oil, and the pressure is adjusted to 350 to 550 kg/cm$^2$.

10. A method of preparing an oil-in-water emulsion which comprises dispersing into water 1 to 15 w/v% based on the emulsion of soybean oil, 0.05 to 0.30 g per g of soybean oil of egg-yolk phospholipids and 0.02 to 3.0 g per g of phospholipids of a fatty acid having 12 to 20 carbon atoms or a salt thereof with arginine, lysine or ornithine, dispersing the aqueous mixture with a homogenizer under a pressure of more than 300 kg/cm$^2$, adding 1 to 30 w/v% based on the emulsion of xylitol or sorbitol and 1 to 15 w/v% based on the emulsion of at least two amino acids selected from the group of L-isoleucine, L-leucine, L-lysine, L-valine, L-methionine, L-threonine, L-tryptophan, L-phenylalanine, L-alanine, L-proline, L-glutamic acid, L-aspartic acid, L-serine, L-arginine, L-histidine, L-tyrosine, L-cystein, L-cystine, and glycine thereto, and again dispersing the resultant aqueous mixture with an homogenizer under a pressure of more than 300 kg/cm$^2$ to give the oil-in-water emulsion in which fat particles have an average diameter of less than 0.5 μ.

11. A method of preparing an oil-in-water emulsion which comprises dispersing into water 1 to 15 w/v% based on the emulsion of soybean oil, 1 to 30 w/v% based on the emulsion of xylitol or sorbitol, 0.05 to 0.30 g per g of soybean oil of egg-yolk phospholipids and 0.02 to 3.0 g per g of phospholipids of fatty acid having 12 to 20 carbon atoms or a salt thereof with arginine, lysine, or ornithine, dispersing the aqueous mixture with an homogenizer under a pressure of more than 300 kg/cm², adding 1 to 15 w/v% based on the emulsion of at least two amino acids selected from the group consisting of L-isoleucine, L-leucine, L-lysine, L-valine, L-methionine, L-threonine, L-tryptophan, L-phenylalanine, L-alanine, L-proline, L-glutamic acid, L-aspartic acid, L-serine, L-arginine, L-histidine, L-tyrosine, L-cystein, L-cystine and glycine, and again dispersing the resultant aqueous mixture with the homogenizer under a pressure of more than 300 kg/cm² to give the oil-in-water emulsion in which fat particles have an average diameter of less than 0.5 μ.

* * * * *